United States Patent Office 3,793,467
Patented Feb. 19, 1974

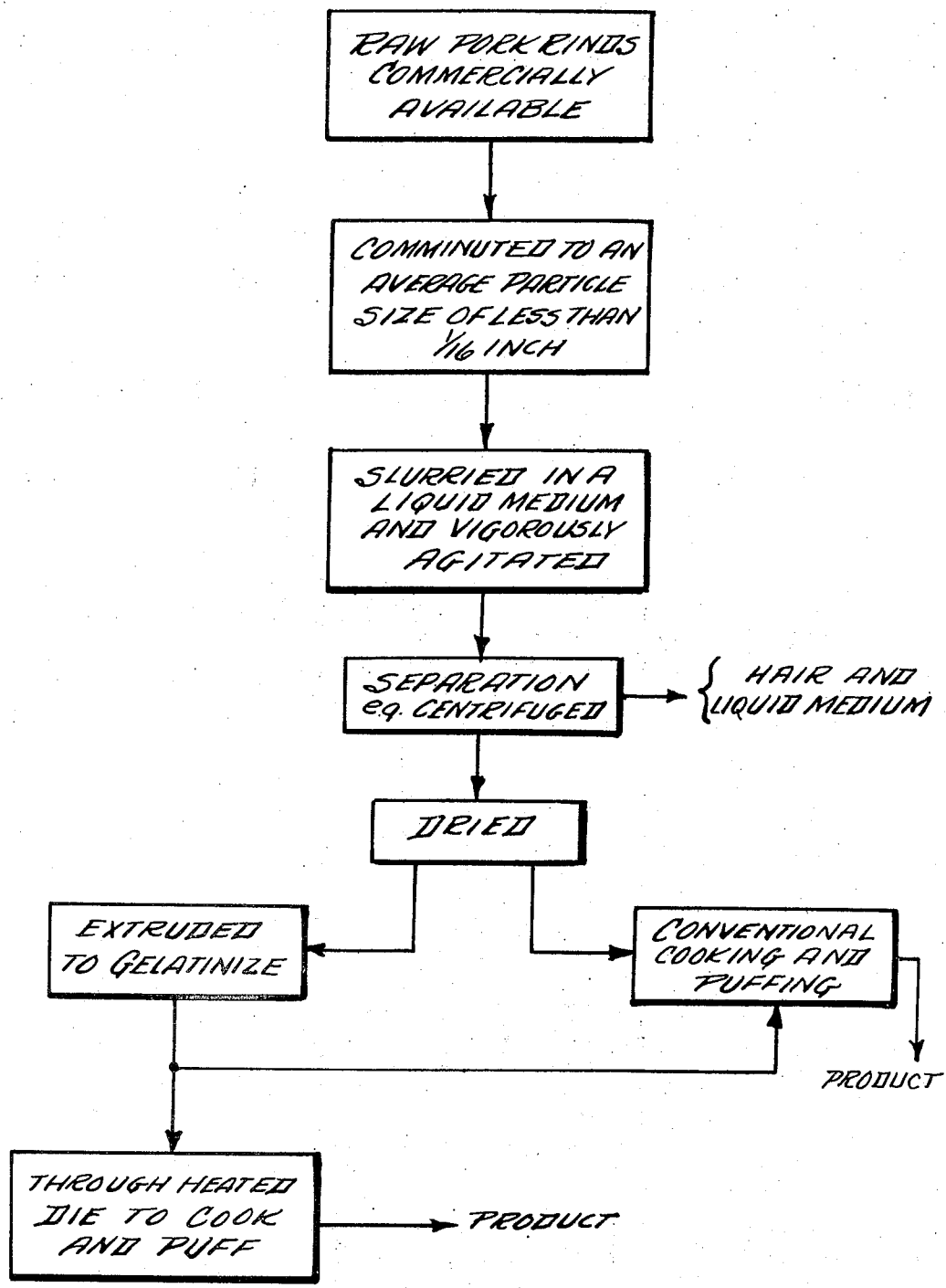

3,793,467
PRODUCTION OF PUFFED PORK RINDS SNACK FOOD
Robert H. Bundus, Tulsa, Okla., and Peter P. Noznick, Evanston, Ill., assignors to Beatrice Foods Co., Chicago, Ill.
Filed Mar. 10, 1972, Ser. No. 233,531
Int. Cl. A22c 18/00
U.S. Cl. 426—445
10 Claims

ABSTRACT OF THE DISCLOSURE

There is provided a process for producing cooked pork rinds by comminuting raw pork rinds to a small particle size, vigorously agitating a slurry of the comminuted rinds in a liquid medium and centrifuging the slurry to remove hair from the rinds. The rinds are then cooked. In the preferred embodiment, the rinds, after centrifuging, are dried and then gelatinized in an extruder; the extrudate is cooked and puffed to produce puffed pork rinds as the extrudate passes through a heated extruder die. Alternately, the extrudate may be cooked and puffed by deep fat frying.

---

The present invention relates to a method of preparing a snack food from pork rinds and to the product produced. More particularly, the invention relates to converting raw or "green" pork rinds to a puffed pork rind snack food.

Puffed pork rinds are a standard item of commerce and are variously known as "fried pork rinds," "cooked pork rinds," "puffed pork rinds" or the same except the term "skins" is used instead of the term "rinds." Traditionally, these puffed pork rinds have been prepared by first trimming out hair-free rind, then drying the rind pieces, then rendering the dried rinds (eliminating excess fat therefrom) by cooking at elevated temperatures in hot fat such that a substantial portion of the fat associated with the dried rinds is removed therefrom. During the rendering, the pork rinds are dried to puffings moisture content and then puffed by immersing in a hot grease, i.e., deep fat frying at temperature above about 250° F., especially above 350° F.

The traditional process, however, suffers from several disadvantages and the art has proposed various alternate processes. For example, in U.S. Pat. 2,907,660, there is described a process wherein the rinds are charged into an open vessel with a grease in a proportion of 20 to about 45% by weight of the rinds and then heated to remove the "free" water associated with the rinds. Thereafter the rinds are again heated, but under pressure, to cause a rendering of the rinds without puffing. The rinds are said to be brittle in character and do not take up water as do prior art rinds. The rinds are then puffed by cooking in grease and the process is said to provide a more crisp product than the traditional rendering and puffing process.

In a somewhat similar process, U.S. Pat. 3,401,045, proposes rendering pork rinds at temperatures between 235° F. and 255° F. for a period of time sufficient to harden the rinds and reduce their original size. The rinds are then treated with flavoring materials, such as a smoked flavor material, and the rinds are allowed to dry. The dry rinds are in a hard and somewhat brittle state, and the dry rinds are then puffed by cooking in hot fat, which can be the fat obtained from the rendering step. It is said that this process provides a superior flavor to the rinds.

A process of a different nature from those described above is disclosed in U.S. Pat. 2,547,747, wherein the pork rinds are cooked under steam pressure to render the rinds and until the rinds are in the form of softened sheets which can be converted into a soft, moist, doughy mass by grinding. The ground material is forced through orifices at the discharge end of the grinder machine, forming extruded strings of the mass, which on standing form a heterogeneous plastic body. The plastic mass may then be formed into various shapes and subsequently cooked and puffed by frying in deep fat. A process similar to the foregoing process is also disclosed in U.S. Pat. 2,562,850.

Both the traditional process and the above alternative processes have certain disadvantages which inherently increase the cost of the puffed pork rinds produced. First of all, those processes require that the pork rind to be ultimately deep fat fried to cause puffing. This is a rather slow and laborious process, and further may result in a nonuniform product, since the deep fat frying step depends upon the fat being at essentially a constant temperature and that the pork rinds placed therein be essentially the same size. Otherwise, temperature fluctuations in the frying step can result in some pork rinds which are undercooked and others which are overcooked or burned. Secondly, the processes require a first rendering step where the fat, normally associated with the raw or green rind, is removed by a separate cooking step. Thirdly, none of the processes have provisions for removing the remaining hair normally associated with the raw or green pork rinds. In this latter regard, raw or green pork rinds have been previously treated by the meat packers to remove a substantial proportion of the hair originally present on the pork bellies from which the rinds are produced. However, this previous hair removal step does not remove all of the hair associated with the pork bellies. As a result of the remaining hair in the raw pork rinds, it is important that the pork rinds before processing be culled or carefully inspected for the inclusion of an intolerable amount of hair. Otherwise, the snack food would be unpalatable and not fit for sale to the consuming public. Conventionally, the amount of hair included in the pork rinds requires that as much as 40% of the rinds be discarded.

Accordingly, objects of the invention are to obviate the above-noted difficulties with the prior art processes and to provide processes for producing puffed pork rinds which are less expensive to perform. These and other objects will be further apparent from the following disclosure and claims.

The prior art disadvantage of the hair normally associated with the commercially available pork rinds may be largely obviated by the present process. While the process may be practiced with either pork bellies or pork rinds, the specification will refer to only the rinds, for sake of simplicity. Briefly stated, it has been discovered that the remaining hair on the pork rinds can be substantially removed by comminuting the pork rinds to a relatively small particle size, suspending and slurrying the comminuted pork rinds in a liquid medium, vigorously agitating the slurry for a sufficient length of time to substantially dislodge the hair associated therewith. Subsequently, the hair is separated from the pork rinds by any convenient method such as with a conventional centrifuge or with a conventional floating process, e.g. with an air-foam flotation-skimming tank. However, centrifuging is preferred.

The present process also obviates the necessity of deep fat frying. Briefly stated, after the pork rinds are removed from the liquid medium, as noted above, the pork rinds are dried to a moisture content of below 20% by weight and then extruded by a conventional food screw extruder in a gelatinized state through a heated die which cooks and puffs the gelatinizing extrudate while passing through the extruder die. Hence, the gelatinized pork rinds may be cooked and puffed by the extruder die and the cooked and puffed extrudate may be comminuted to any desired length. As can be appreciated, this extrusion process does not require that the rinds be first rendered, since this automatically happens in the drying process, and for efficiency hot fat rendering/drying in hot air may be combined. In this latter regard, the die of the extruder may not be heated and the extruded gelatinized mass may be cooked and puffed by the traditional method of deep fat frying, which alternative method still obviates the need of first rendering the pork rinds, although it does not mitigate entirely the problems associated with deep fat frying, as noted above.

Hence, in summary, it can be seen from the foregoing brief description of the invention that the present process provides methods of removing substantial proportions of hair left on commercial pork rinds and allows the use of the product from the dehairing step to be used directly to produce puffed pork rinds without the conventional rendering step. Further, as a preferred embodiment of the invention, the process allows the production of puffed pork rinds without the necessity of utilizing the prior art step of deep fat frying. Having briefly described the invention and the advantages obtained thereby, the following detailed discussion of the invention will illustrate the invention in terms of specific embodiments.

As noted above, raw or green pork rinds are commercially available in a partially dehaired state, but the amount of hair remaining on the commercial rinds is sufficient to cause rejection of up to 40% of the total weight of rinds. In the present process, the commercially available pork rinds are comminuted, e.g. cut, in a comminuting machine that slices the rinds in sections of dimensions, preferably, less than the folicle diameter of the hair, but in any case to an average particle size not greater than $\frac{1}{16}''$. This comminuting step is important and it is necessary that the particular machine used comminute the pork rinds to the abovenoted extent. The particular mechanical configuration of the machine is, however, not important, so long as it can cut the rinds to the required sizes. Hence, any of the conventional comminuting machines so-capable, may be used. As noted above, the average particle size in any case must be less than $\frac{1}{16}$ inch, and average particle sizes of less than $\frac{1}{32}$ inch, e.g. $\frac{1}{64}$ inch are particularly preferred. For best results, of course, sizes less than the diameter of the hair follicle should be used. The cut pork rinds are then suspended in any convenient liquid to form a slurry medium. The ratio of cut pork rinds to liquid medium is not narrowly critical, but the weight ratio of cut pork rinds to liquid medium should be sufficiently high that inordinate amounts of liquid need not be handled. However, the ratio should also be low enough that a clean separation of the hair from the cut rinds is obtained. For example, the suspension of pork rinds in the liquid medium may conveniently form a slurry with as high as 75% by weight of cut pork rinds therein, or as low as 1% by weight of the cut pork rinds therein. However, the higher percentage may not provide a very clean separation of the hair and cut pork rinds during the following separation and the low percentage of cut pork rinds in the liquid medium would not be economical in view of the large volumes of liquid that must be processed for the relatively low amounts of pork rinds. Accordingly, for best convenience, on a weight basis, between 10 and 50% of the slurry will be the cut pork rinds, especially between 25% and 40%.

After the slurry of cut pork rinds and the liquid medium is obtained, the slurry is vigorously agitated with any conventional agitator. The particular agitator is not important and the degree of agitation is not narrowly critical, but the agitation must be sufficiently vigorous that most of the remaining hair attached to the cut pork rinds is separated therefrom under the influence of the stress thereon during the vigorous agitation. This degree of agitation will depend upon the particular average particle size of the cut pork rinds, as well as the configuration of the vessel containing the slurry and the type of agitation used. One skilled in the art may easily determine the minimum amount of agitation required by simple experimentation with any particular average particle size of cut rinds, configuration of vessel and agitator which may be desired to use. Nevertheless, the agitation should be quite vigorous in order that a significant amount of hair will be removed from the cut pork rinds.

The liquid medium in which the cut pork rinds are slurried is not critical and its chemical properties are not important to the process so long as the liquid is essentially nondeleterious to the pork rinds. As noted above, after the vigorous agitation which separates the hair from the cut pork rinds, the hair is then separated from the cut pork rinds. Accordingly, the liquid medium in which the cut pork rinds are slurried should have a density which is different from the density of the hair and the pork rind, for example, by at least about 10% e.g. at least 2 to 5%. Water falls within this range and is the most economical liquid for producing the slurry. However, other nontoxic liquids such as glycerols, lower alkanols, lower alkyl esters and lower alkyl ketones may be used. Alternately, a solute is dissolved in the liquid medium to effect a different density of the solution. Any nontoxic solute may be used but salts, such as between 1% and 5% by weight of sodium chloride, are most economical. However, any other nontoxic solutes which will provide a different density may be used, for example, sugar. In the preferred embodiment of the invention, however, water, which has a sufficient density difference from the hair and pork rinds, is used, either alone or with a solute such as sodium chloride or sugar. The time of vigorous agitation is not critical and a simple occasional visual check will tell one skilled in the art when essentially no further removal of hair is being made. At this time the agitation is stopped. However, usually, agitation is carried out for at least 1 minute, preferably at least 5 minutes, e.g. 10 minutes. There is no maximum time for agitation, but usually no further hair is removed after about 1 to 2 hours.

As noted above, the separation operation may be carried out with a conventional centrifuge, e.g. a basket centrifuge or a solid bowl centrifuge. The basket centrifuge, of course, is a batch process, while the solid bowl centrifuge is a continuous process. The particular centrifuge utilized is not important and it is only necessary that the centrifuge used develops sufficient centrifugal force to cause separation of the hair and the pork rinds in the slurry. Whether a particular centrifuge is acceptable for this purpose can be determined by one skilled in the art by a simple test of that particular centrifuge. Hence, the centrifuge should be capable of exerting sufficient centrifugal force on the slurry of pork rinds and hair to make a substantial separation of the same, especially bearing in mind the density differences between the liquid medium and the hair and pork rinds, as noted above. The time of centrifuging is not critical so long as a sufficient separation is accomplished, as will be apparent to one skilled in the art, but times from about at least 1 minute up to 30 minutes will be used although longer times may be used if desired.

When air-foam flotation is used, the slurry (after agitation) is simply foamed with any conventional nontoxic foaming agent (many are well known to the art) and the foam carries the hair to the top of the tank where it is skimmed-off. This means of separation of materials is well known in the art and no further details are required herein.

Since the present method relies upon the stress during the vigorous agitation, and to some extent the action during the separation operation, to remove hair from the cut pork rinds, it is not necessary that the liquid medium be heated either during the vigorous agitation or separation. However, if desired, elevated temperatures or even subambient temperatures of the liquid and/or slurry may be used, e.g. from about 32° F. to about 175° F. or from the freezing point to the boiling point of the liquid medium, but in any case temperatures between about 50° F. and 150° F. are recommended.

After the cut pork rinds are removed from the liquid medium the pork rinds may be treated at this point with flavoring agents to impart desired flavors thereto. For example, the cut pork rinds may be smoked in a conventional manner or a smoke flavor may be added to the pork rinds. Alternately, flavoring may be added just prior to the final step of cooking and puffing the pork rinds or at any other point in the process subsequent to centrifuging.

However, if smoking of the cut pork rinds is to be used for flavoring the pork rinds, then the smoking can also accomplish a drying step to reduce the moisture content of the pork rinds. In any case, pork rinds are reduced to a moisture content of less than 20% e.g. less than 15% by weight. Moisture contents of between 5 and 15%, especially between 10 and 15% by weight are preferred. Whether smoking is used as the drying method or not, the pork rinds are dried in any conventional manner, e.g. ovens, to the moisture contents noted above.

The pork rinds are then in a condition which is ideally suited for use in the extrusion process of the present invention, and the combination of the method of dehairing the pork rinds with the subsequent direct use of the dehaired and dried rinds in the present extrusion process, forms an important feature of the invention. Hence, the cut, dehaired and dried pork rinds are in a condition which can be readily utilized by the extrusion process, as opposed to the size and condition of the pork rinds normally produced by prior art processes. Accordingly, while the present dehaired pork rinds can be used in any of the prior art processes for producing puffed pork rinds, or otherwise, the dehaired pork rinds of the present invention find their greatest utility when used in the extrusion process of the present invention. Therefore, the combination of the present dehairing process coupled with the present extrusion process, provides advantages, when used together, that are not obtainable when the processes are practiced separately. Under these circumstances, the combination of the present dehairing process and extrusion process forms a major feature of the invention. As can be easily appreciated, the present extrusion process would not be able to adequately handle large pieces of pork rinds, due to the difficulty in masticating and gelatinizing the same in a conventional extrusion process, but the small cut particles of the pork rinds obtained from the dehairing process are ideally suited for use in the extrusion process of the invention.

When the pork rinds have been reduced to the moisture content noted above, they are fed to a conventional screw-extruding machine for producing snack foods. While any conventional extruding device may be used, suitable extrusion devices are disclosed in U.S. Pat. 2,915,957. Irrespective of the particular extruder being utilized, the extruder must be capable of masticating the cut pork rinds and be capable of generating sufficient pressure and temperature (external heat may be used if desired) to form a gelatinous mass from the cut pork rinds. This gelatinous mass will have associated therewith the fat content of the dried rinds, since a conventional rendering process of the pork rinds is not required with the present invention. Hence, the fat associated with the dried pork rinds is ideally suited for providing the grease necessary for cooking the pork rinds during mastication and extruding. The amount of grease associated therewith also provides the fat flavor required for full flavor of puffed pork rinds.

However, in the cases of excess fat connected with the pork rinds, during the extrusion step excess fat may be eliminated from the extruder barrel. The fat may be eliminated by way of a tap conveniently placed in the barrel. For example a tap may be placed in the barrel just after the first high pressure zone in the extruder barrel. However, a tap need not be provided and excess fat can be expressed out of the extruder die at the same time the gelatinized rinds are extruded.

The gelatinous mass obtained by action of pressure and temperature in the screw extruder is then expressed through any conventional extruder die to form a continuous shape of the gelatinous mass. The shape may be as desired, but suitably is in the shape of a rod or ring or other desired configuration. As noted above, the extruder die may be heated to a high temperature, e.g. between 300 and 500° F., especially between 350 and 450° F., which will allow the gelatinous mass to be fully cooked and expanded as it is expressed out of the extruder die. Since the mass is fully cooked, the mass may be simply comminuted by action of knives or other cutters positioned adjacent the face of the extruder die, as is conventional in the art, to cut the cooked mass in the desired lengths. This temperature of the extrusion die will also puff the gelatinous mass to form it in the shape normally associated with puffed pork rinds. The product is then simply cooled, and flavoring, salt, preservatives and the like, as noted above, are simply added at this point, if not added earlier in the process. All of these additives are conventional in the art and it is not necessary to describe these conventional ingredients for pork rinds. The product is then ready for packaging in any conventional manner.

Alternately, instead of using an externally heated extruder die, an unheated die may be used (heating normally occurs from extrusion) and the cut, extruded, gelatinous mass may be cooked by deep fat frying according to the traditional method, as noted above, for cooking and puffing the pork rinds. It will be appreciated, however, that the heat and pressure generated during extrusion, without a heated die, is nevertheless sufficient to fuse the collagen in the pork rinds, even though this heat and pressure is not sufficient to fully cook the rinds. Heat and pressure are, of course, critical to obtain the fusion of the collagen in the extruder.

The overall process will be illustrated in connection with the single figure of drawing, which is a block schematic of the process.

As can be seen from the drawing, the schematic of the process summarizes the above-discussed steps. Hence, raw pork rinds, which are commercially available, are comminuted to an average particle size of less than 1/16 inch. The cut pork rinds are slurried in a liquid medium and vigorously agitated to separate the hair from the cut pork rinds. Thereafter, the hair and the liquid medium are separated from the slurry, and the separated cut pork rinds are then dried. The dried pork rinds may then be cooked in the conventional manner by deep fat frying, optionally, after shaping into any desired form, but according to the preferred embodiment of the invention, the dried pork rinds are passed through an extruder to gelatinize the same. The gelatinized pork rinds may be shaped by any desired design of the extruder die or the extruded mass may be otherwise shaped by molding, e.g. as described in U.S. Pat. 2,915,957. The shaped rinds may then be cooked in the conventional fashion, but according to the more preferred embodiment of the invention, the gelatinized pork rinds are passed through a heated extruder die which cooks the pork rinds and puffs them in the same operation. Thereafter, they are simply comminuted to a desired length and flavored as desired, if not previously flavored.

The following example will illustrate the preferred embodiment of the invention, which is considered the best mode of the invention. However, it should be noted that the invention is not limited to the specific example, but the specific example merely illustrates the invention.

EXAMPLE

Raw pork rinds are comminuted to an average particle size of approximately 1/32 of an inch in a conventional slicing mill. The comminuted pork rinds are then slurried in a 3% aqueous solution of sodium chloride and vigorously agitated in a cylindrical tank with a dished bottom, by means of a propeller mixer suspended from the top of the tank with the propeller disposed about 1/3 of the distance from the bottom of the tank. The propeller operates at an r.p.m. of about 1800 revolutions per minute and accomplishes vigorous agitation of the slurry of cut pork rinds. The temperature of the slurry is ambient temperature, i.e. about 70° F. The agitation is continued for approximately 30 minutes, at which time a substantial portion of the hair originally on the raw pork rinds has been displaced by the agitation of the slurry of comminuted particles. Through a bottom draw-off of the tank, the slurry is passed, in a batch manner, to a centrifuge which centrifuges the slurry and deposits the aqueous solution and hair as an effluent of the centrifuge. The dehaired pork rinds are removed from the centrifuge and placed in a conventional rotary tumble dryer. The pork rind particles are heated for approximately one hour at 200° F. with hot smoke to a moisture content of approximately 10% by weight. The dried pork rinds are fed in a continuous manner to a conventional extruder of the nature described in U.S. Pat. 2,915,957 and gelatinized in the screw portion of the extruder with additional heat being applied to the barrel of the extruder. The barrel of the extruder has a maximum temperature of 300° F. The die of the extruder is a simple plate die with 18 holes of 3/16 inch diameter. The die plate is heated to a temperature of 410° F. The extruder is operated at a rate of 160 pounds per hour of the dried pork rinds. A cooperating knife blade adjacent the face of the die chops the extrudate to a length of 1 inch as it passed from the extruder die. The cooked and puffed pork rinds are then tumbled in a conventional tumbling machine wherein the pork rinds are colored with a yellow food color and to which salt and a preservative, BHT, is added. The pork rinds are then packaged. The product of the invention has a very pleasant taste, is crisp and uniform in texture and has the general appearance of conventional puffed pork rinds.

What is claimed is:

1. A process for producing cooked pork rinds comprising comminuting raw pork rinds to an average particle size of less than 1/16 inch, slurrying the comminuted pork rinds in a nontoxic aqueous liquid medium which is nondeleterious to the pork rinds and wherein the slurry contains from 1% to 75% by weight of the pork rinds, vigorously agitating the slurry to remove hair from the pork rinds, separating the hair and liquid medium from the pork rinds, drying the pork rinds to a moisture content of between 5–20% by weight of the pork rinds, and cooking the pork rinds.

2. The process of claim 1 wherein the cooking also puffs the pork rinds to produce puffed pork rinds.

3. The process of claim 1 wherein the dried pork rinds are extruded at sufficient temperature and pressure to gelatinize the pork rinds during extrusion and the gelatinized pork rinds are then shaped, cooked and puffed.

4. The process of claim 3 wherein the gelatinized extrudate is comminuted in length and then cooked and puffed.

5. The process of claim 4 wherein the cooking and puffing is accomplished by extruding the gelatinized pork rinds through an extruder die heated to a temperature between 300 and 500° F.

6. The process of claim 1 wherein the aqueous medium contains between 1 and 5% by weight of sodium chloride.

7. The process of claim 1 wherein the average particle size of the comminuted raw pork rinds is less than 1/32 inch.

8. The process of claim 1 wherein the moisture content is between 5–15% by weight of the pork rinds.

9. The process of claim 1 wherein the separation is by centrifuging.

10. The process of claim 1 wherein the separation is by flotation.

References Cited

UNITED STATES PATENTS

| | | | |
|---|---|---|---|
| 2,562,850 | 7/1951 | Winslow | 99—107 |
| 3,401,045 | 9/1968 | Halpern | 99—107 |

HYMAN LORD, Primary Examiner

U.S. Cl. X.R.

426—442, 480, 506, 518